(12) United States Patent
Wroge

(10) Patent No.: US 11,396,255 B2
(45) Date of Patent: Jul. 26, 2022

(54) SHELTER AND STORAGE POD SYSTEM

(71) Applicant: Steven William Wroge, Spokane Valley, WA (US)

(72) Inventor: Steven William Wroge, Spokane Valley, WA (US)

(*) Notice: Subject to any disclaimer, the term of this patent is extended or adjusted under 35 U.S.C. 154(b) by 142 days.

(21) Appl. No.: 16/843,847

(22) Filed: Apr. 8, 2020

(65) Prior Publication Data
US 2021/0129732 A1 May 6, 2021

Related U.S. Application Data

(60) Provisional application No. 62/931,176, filed on Nov. 5, 2019.

(51) Int. Cl.
*B60P 3/39* (2006.01)
*B60P 3/34* (2006.01)
*B60D 1/42* (2006.01)
*B60D 1/00* (2006.01)

(52) U.S. Cl.
CPC .............. *B60P 3/39* (2013.01); *B60D 1/42* (2013.01); *B60P 3/34* (2013.01); *B60D 2001/003* (2013.01)

(58) Field of Classification Search
CPC ..................................... B60P 3/38; B60P 3/39
See application file for complete search history.

(56) References Cited

U.S. PATENT DOCUMENTS

| | | | | |
|---|---|---|---|---|
| 3,303,769 A * | 2/1967 | Williams | ............... | B60H 1/267 454/94 |
| 4,537,441 A * | 8/1985 | McCleary | ................. | B60P 3/32 220/4.21 |
| 4,702,518 A * | 10/1987 | Paerisch | ................ | B60J 7/0046 296/214 |
| 5,738,397 A * | 4/1998 | Grody | ..................... | E05C 19/18 292/258 |
| 6,824,205 B2 * | 11/2004 | Cooney | ....................... | B60J 7/22 296/213 |
| 7,144,070 B2 * | 12/2006 | Wiebe | .................... | B60J 7/1621 296/185.1 |
| 8,636,094 B1 * | 1/2014 | Conner | ................ | B62K 27/006 180/204 |

(Continued)

FOREIGN PATENT DOCUMENTS

GB     2460126 A  * 11/2009  ............. B62K 27/04
SE     1151220 A1 *  6/2013

*Primary Examiner* — Joseph D. Pape

(57) ABSTRACT

A shelter and storage pod system is provided comprising a pod comprising a top wall, a bottom wall and four sidewalls, where the pod is structurally divided into a top portion and a bottom portion. A first hinge couples the top portion to the bottom portion. One or more ventilation ports are structurally integrated into the top wall, bottom wall, four sidewalls or any combination thereof. A reinforcing frame member is coupled to the bottom wall and comprises a yoke arm and a plurality of wheels coupled thereto. A bedding substrate is disposed adjacent and orthogonal to the four sidewalls, where the bedding substrate is coupled to one sidewall via a second hinge. One or more vertical frame walls define a plurality of storage compartments disposed under the bedding substrate, where the one or more vertical frame walls structurally support the bedding substrate. An adjustable coupling sleeve operatively couples to the reinforcing frame member via the yoke arm.

20 Claims, 2 Drawing Sheets

(56) References Cited

U.S. PATENT DOCUMENTS

| | | | | |
|---|---|---|---|---|
| 10,023,261 B2* | 7/2018 | Kilcrease | ............... | B62K 27/04 |
| 2006/0273622 A1* | 12/2006 | Laird | ..................... | B60P 3/105 |
| | | | | 296/168 |
| 2009/0007948 A1* | 1/2009 | Dempsey | ............... | E04H 15/06 |
| | | | | 135/96 |
| 2018/0339640 A1* | 11/2018 | Shuttleworth | ....... | B62K 27/003 |

* cited by examiner

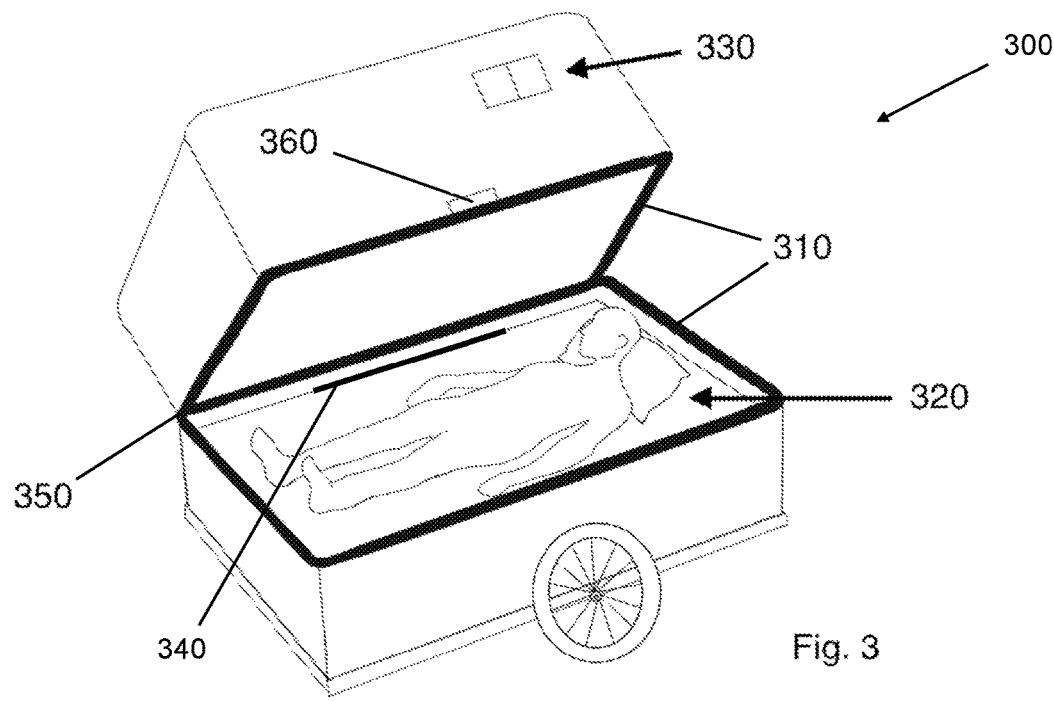
Fig. 3
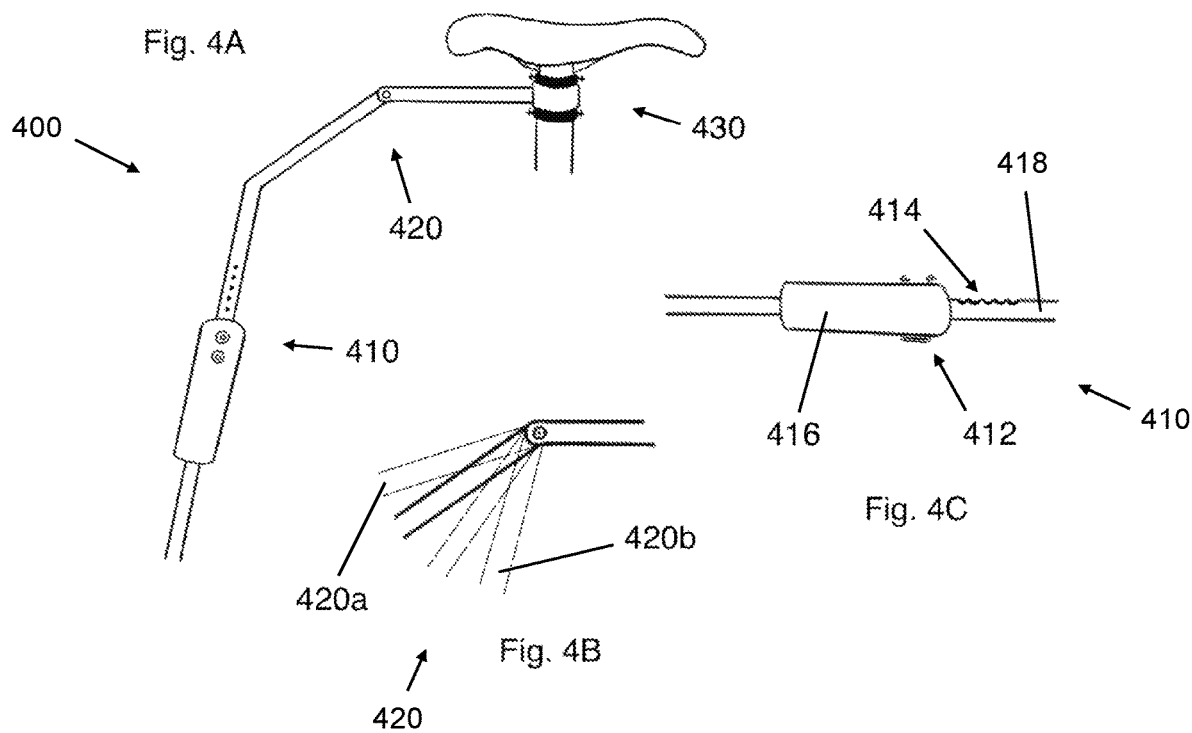
Fig. 4A
Fig. 4B
Fig. 4C

SHELTER AND STORAGE POD SYSTEM

CROSS-REFERENCE TO RELATED APPLICATIONS

This application claims priority to U.S. Provisional Patent Application Ser. No. 62/931,176, entitled "SHELTER AND STORAGE POD SYSTEM," filed Nov. 5, 2019. The contents of this application are hereby incorporated by reference in their entirety.

BACKGROUND OF THE INVENTION

As urban areas continue to grow, so do the number of homeless individuals living in such areas. Tens of millions of people worldwide are homeless based upon United Nations estimates. Even worse, about 1.6 billion are estimated to lack adequate housing worldwide. Such inadequate housing exposes the individual to harsh environmental elements, such as air pollution, extreme temperatures, theft of personal belongings, physiological deterioration and the like.

Often, simply a lack of funding is the root cause of the individual's inability to secure reasonable shelter. Further, the cost of securing such reasonable shelter continues to rise, leaving individuals with no other choice but to live homeless for at least a period of time if not indefinitely. A cost-effective means of securing reasonable shelter is desired. Lack of adequate housing is becoming a crisis in many countries and any solutions mitigating this trend would be welcomed. Therefore, it would be advantageous to provide a shelter and storage pod system that meets the aforementioned needs.

BRIEF DESCRIPTION OF THE DRAWINGS

FIG. 3 is a detailed view of a pod in use in accordance with some embodiments of the present invention.

FIG. 4A is an overview of an adjustable coupling sleeve in accordance with some embodiments of the present invention.

FIG. 4B is a detailed view of a swivel joint associated with an adjustable coupling sleeve in accordance with some embodiments of the present invention.

FIG. 4C is a detailed view of an adjustable shroud associated with an adjustable coupling sleeve in accordance with some embodiments of the present invention.

DETAILED DESCRIPTION OF THE INVENTION

Figure 1:
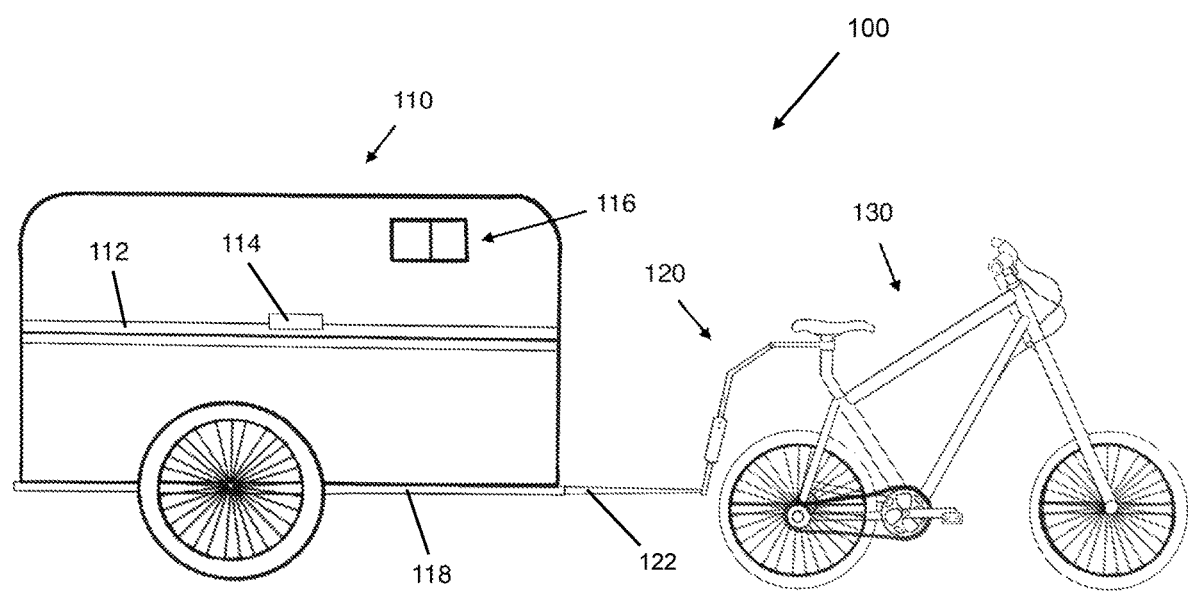
FIG. 1 is an overview of a shelter and storage pod system in accordance with some embodiments of the present invention.

In some embodiments, a shelter and storage pod system is provided comprising a pod comprising a top wall, a bottom wall and four sidewalls, wherein the pod is structurally divided into a top portion and a bottom portion; a first hinge coupling the top portion to the bottom portion, wherein the top and bottom portions are movable relative one another via user actuation of a handle locking mechanism, wherein the handle locking mechanism may be locked and unlocked from an interior and an exterior of the pod; one or more ventilation ports structurally integrated into the top wall, bottom wall, four sidewalls or any combination thereof; a reinforcing frame member coupled to the bottom wall and comprising a yoke arm and a plurality of wheels coupled thereto; a bedding substrate disposed adjacent and orthogonal to the four sidewalls, wherein the bedding substrate is coupled to one sidewall via a second hinge; one or more vertical frame walls defining a plurality of storage compartments disposed under the bedding substrate, wherein the one or more vertical frame walls structurally support the bedding substrate; and an adjustable coupling sleeve operatively coupled to the reinforcing frame member via the yoke arm.

In some embodiments, the pod exterior comprises a plurality of light emitting diodes, optical reflectors or any combination thereof.

In some embodiments, the one or more ventilation ports each are selectively waterproof, are substantially transparent and comprise one or more membranous air filters therein.

In some embodiments, the yoke arm comprises a substantially Y-shaped frame and couples together the reinforcing frame member and the adjustable coupling sleeve.

In some embodiments, the bedding substrate rotates upwards about the second hinge to allow access to the plurality of storage compartments thereunder.

In some embodiments, a reinforcing seam closure is disposed along each of a bottom surface of the top portion of the pod and a top surface of the bottom portion of the pod.

In some embodiments, the handle locking mechanism is structurally coupled to at least two of the sidewalls of the top and bottom portions of the pod.

In some embodiments, the adjustable coupling sleeve comprises an adjustable shroud, a swivel joint and a vehicle attachment mechanism.

In some embodiments, the adjustable shroud comprises first and second elongate members each having a plurality of apertures therethrough, wherein the first and second elongate members are coupled together via one or more threaded bolts disposed through the apertures and cooperating locking nuts.

In some embodiments, the vehicle attachment mechanism is modularly coupled to the swivel joint and replaceable based upon a type of vehicle to which the pod is to be coupled.

In some embodiments, the adjustable coupling sleeve couples the pod to a vehicle.

In some embodiments, the vehicle is a bicycle, a motorcycle, a car, a scooter, a moped or any combination thereof.

In some embodiments, a shelter and storage pod system is provided comprising a pod comprising a top wall, a bottom wall and four sidewalls, wherein the pod is structurally divided into a top portion and a bottom portion; a first hinge coupling the top portion to the bottom portion, wherein the top and bottom portions are movable relative one another via user actuation of a handle locking mechanism, wherein the handle locking mechanism may be locked and unlocked from an interior and an exterior of the pod; one or more ventilation ports structurally integrated into the top wall, bottom wall, four sidewalls or any combination thereof; a reinforcing frame member coupled to the bottom wall and comprising a yoke arm and a plurality of wheels coupled thereto, wherein the yoke arm comprises a substantially Y-shaped frame and couples together the reinforcing frame member and the adjustable coupling sleeve; a bedding substrate disposed adjacent and orthogonal to the four sidewalls, wherein the bedding substrate is coupled to one sidewall via a second hinge; one or more vertical frame walls defining a plurality of storage compartments disposed under the bedding substrate, wherein the one or more vertical frame walls structurally support the bedding substrate, and wherein the bedding substrate rotates upwards about the second hinge to allow access to the plurality of storage compartments thereunder; and an adjustable coupling sleeve operatively coupled to the reinforcing frame member via the yoke arm, wherein the adjustable coupling sleeve comprises an adjustable shroud, a swivel joint and a vehicle attachment mechanism.

In some embodiments, a shelter and storage pod system is provided comprising a pod comprising a top wall, a bottom wall and four sidewalls, wherein the pod is structurally divided into a top portion and a bottom portion, and wherein a reinforcing seam closure is disposed along each of a bottom surface of the top portion of the pod and a top surface of the bottom portion of the pod; a first hinge coupling the top portion to the bottom portion, wherein the top and bottom portions are movable relative one another via user actuation of a handle locking mechanism, wherein the handle locking mechanism may be locked and unlocked from an interior and an exterior of the pod; one or more ventilation ports structurally integrated into the top wall, bottom wall, four sidewalls or any combination thereof, wherein the handle locking mechanism is structurally coupled to at least two of the sidewalls of the top and bottom portions of the pod; a reinforcing frame member coupled to the bottom wall and comprising a yoke arm and a plurality of wheels coupled thereto, wherein the yoke arm comprises a substantially Y-shaped frame and couples together the reinforcing frame member and the adjustable coupling sleeve; a bedding substrate disposed adjacent and orthogonal to the four sidewalls, wherein the bedding substrate is coupled to one sidewall via a second hinge; one or more vertical frame walls defining a plurality of storage compartments disposed under the bedding substrate, wherein the one or more vertical frame walls structurally support the bedding substrate, and wherein the bedding substrate rotates upwards about the second hinge to allow access to the plurality of storage compartments thereunder; and an adjustable coupling sleeve operatively coupled to the reinforcing frame member via the yoke arm, wherein the adjustable coupling sleeve comprises an adjustable shroud, a swivel joint and a vehicle attachment mechanism, wherein the adjustable shroud comprises first and second elongate members each having a plurality of apertures therethrough, wherein the first and second elongate members are coupled together via one or more threaded bolts disposed through the apertures and cooperating locking nuts, and wherein the vehicle attachment mechanism is modularly coupled to the swivel joint and replaceable based upon a type of vehicle to which the pod is to be coupled.

Before describing the present invention in detail, it is to be understood that the invention is not limited to any one of the particular embodiments, which of course may vary. It is also to be understood that the terminology used herein is for the purpose of describing particular embodiments only, and therefore is not necessarily intended to be limiting. As used in this specification and the appended claims, terms in the singular and the singular forms "a," "an," and "the" include plural referents unless the context clearly dictates otherwise. Thus, for example, reference to "a shelter and storage pod system" also includes a plurality of shelter and storage pod systems, and the like.

Exemplary embodiments of the present invention are illustrated in the accompanying figures. As shown in FIG. 1, a shelter and storage pod system 100 is provided. The system generally comprises a pod 110 having top and bottom halves meeting at a reinforced seam closure 112 for selectively sealing an interior of the pod 110. One or more handles 114 allow a user to selectively open the pod 110 and separate the top and bottom halves from one another via a hinge (not shown) disposed on a side opposite that of the handle 114. Additionally, the exterior of the pod 110 may comprise one or more LEDs, reflectors or similar illumination devices.

The pod 110 further comprises one or more ventilation ports 116 that allow for regulation of temperature and oxygen levels within the interior of the pod 110. The port 116 may filter out select airborne particulates from the fluid passing through the port 116 via one or more membranous filters. The port 116 may be manually opened and closed via the user and further may be substantially transparent to allow the user to see outside of the pod 110. Additional ports 116 may be disposed on each of four sidewalls of the pod 110 to allow the user to view outside of each sidewall of the pod 110. Further, each port 116 may be selectively waterproof during times of rain to allow the user to collect fresh rainwater or to keep the interior of the pod 110 dry.

The pod 110 further comprises a top wall and bottom wall coupled to the four sidewalls. At the bottom wall is disposed a reinforcing frame member 118 structured to fortify and stabilize the top, bottom and sidewalls of the pod 110. Additionally, the bottom, sidewalls and frame member 118 may be further stabilized together via a support band contained within a horizontally oriented indented ridge within the exterior of the top portion of the bottom half of the pod 110. Further, a first end of the frame member 118 adjacent an adjustable coupling sleeve 120 comprises a Y-frame yoke arm 122 extending from the first end for connection to the sleeve 120 as shown in FIG. 1. The yoke arm 122 comprises triangular support plates at a first end for mechanical coupling to the frame member 118. At a second end the yoke arm 122 terminates into a first end of the adjustable coupling sleeve 120. Additionally, the pod 110 comprises at least two wheels which are directly coupled to a suspension system, leaf springs, shock absorbing system etc. and stabilized by the frame member 118 as shown. Further, the Y-frame yoke arm 122 may comprise a spare wheel and tire that may be removably coupled thereto.

Figure 2:
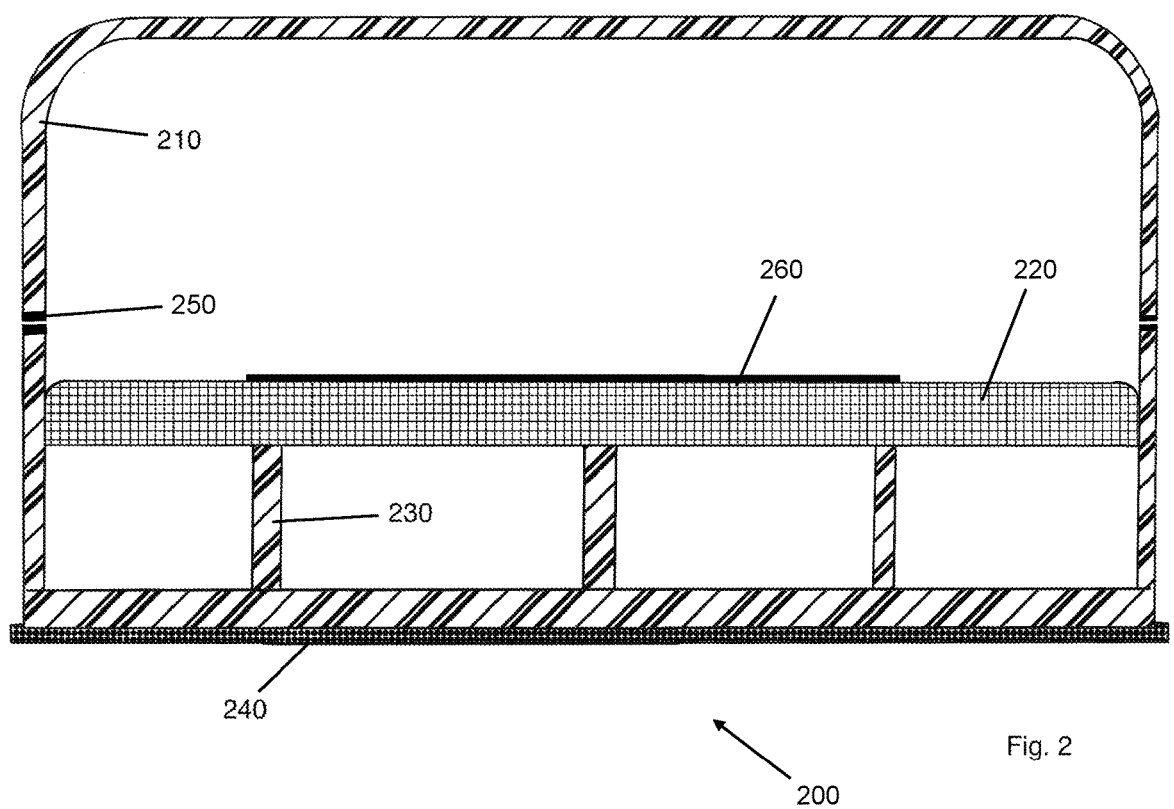
FIG. 2 is a cross-sectional view of a pod in accordance with some embodiments of the present invention.

As shown in FIG. 2, an exemplary cross-sectional view of a pod 200 is portrayed. The pod 200 comprises an interior space defined by an exterior frame 210. The exterior frame 210 may comprise any suitable robust materials such as, but not limited to, lightweight or heavyweight plastics and fiberglass, stainless steel and similar alloys, carbon fiber, aluminum or similar combinations thereof. Further, the exterior frame 210 may further comprise one or more directly adjacent layers of thermally insulating materials to regulate the temperature within the interior of the pod 200. Alternatively, additional layers of materials including, but not limited to, fiberglass, vinyl rubber matting, lightweight polymer plastics, rubber bushings and the like may be utilized for additional damping of vibration and/or noise.

A bedding substrate 220 is disposed within the interior of the pod 200 and coupled to a plurality of the sidewalls thereof. The bedding substrate 220 may be made of a material providing cushioning support to the user in the form of a suitable material such as, but not limited to, foam and similar membranous materials that may be covered by a vinyl material or similar waterproof material. Beneath the cushioning support material the bedding substrate 220 may comprise one or more layers of fiberglass, carbon fiber, aluminum or similar lightweight materials. Underneath the bedding substrate 220 are disposed a plurality of storage compartments separated by vertical frame walls 230 as shown in FIG. 2 which may be made from fiberglass, carbon fiber or like materials. The user may access the storage compartments by manually lifting the bedding substrate 220 upwards via a hinge 260, removable couplings or the like. The bedding substrate 220 along with the vertical frame walls 230 may provide support for at least 500 lbs.

Supporting each of the exterior frame 210, bedding substrate 220 and vertical frame walls 230 is a reinforcing frame member 240 disposed adjacent the bottom wall of the exterior frame 210. The reinforcing frame member 240 may be made of a more robust material than the exterior frame 210 material, thus allowing fortification and stabilization of the frame 210, substrate 220 and walls 230 during operation of the shelter and storage pod system. Specifically, the reinforcing frame member 240 may be comprised of one or more layers of waffled fiberglass, robust polymer plastics, vinyl rubber matting, stainless steel and similar alloys, carbon fiber, aluminum or combinations thereof. Each of the one or more layers and the exterior frame 210 may be coupled together via a plurality of bolts, nuts, washers, rubber bushings and the like. The plurality of layers provide additional shock absorption and dampening along with one or more leaf springs that may be coupled to axels of the pod 200. Further, the reinforcing frame member 240 may extend horizontally beyond the lateral extents of the exterior frame 210 and curve upwards, thus providing a ridge conforming to the dimensions of the exterior frame 210 to laterally constrain it therein. Additionally, the reinforced seam closure 250 runs horizontally through each of the four sidewalls and therefore separates the top and bottom halves of the pod 200. The reinforced seam closure 250 seals the interior of the pod 200 from external elements and further serves to dampen the closure impact between the top and bottom halves of the pod 200.

As shown in FIG. 3, a detailed view of a pod 300 is portrayed during use by a user 320 who enters the interior of the pod 300 by manually opening the pod 300 along a reinforced seam closure 310 via the handle 360. The top half of the pod 300 opens from the bottom half via a hinge 350 which prevents the top half from opening too far. The handle 360 further comprises a built-in lock that may utilize a plurality of rotating J-hooks or the like that lock the top half to the bottom half of the pod 300 and prevents the handle 360 from being utilized to open the pod 300. Further, the handle 360 may have a cooperating interior lock to be accessed by a user 320.

During use, the pod 300 may be made stationary by locking rotation of wheels thereof via one or more locking/braking mechanisms and by use of one or more pivotable immobilization legs disposed at each corner of the pod 300. Such locking and use of immobilization legs may be performed manually by the user 320 and/or via a parking actuation device in the form of a hand brake. Upon making the pod 300 stationary, the user 320 may enter the pod 300 interior and lay prostrate therein upon a bedding substrate. Alternatively, the user 320 may at least partially remove the bedding substrate to access a plurality of storage compartments thereunder. The bedding substrate may utilize one or more layers of blankets or insulation that may be removably attached to the sidewalls of the pod 300. Additionally, a second hinge 340 may be utilized along a first side of the bedding substrate to be used as a rotational leverage point for the user 320 when lifting a second side of the bedding substrate to access the plurality of storage compartments thereunder.

As shown in FIG. 4A, an overview of an adjustable coupling sleeve 400 is portrayed. The coupling sleeve 400 comprises an adjustable shroud 410, a swivel joint 420 and a vehicle attachment mechanism 430. In one exemplary embodiment, a bicycle may be attached to the shelter and storage pod system. The bicycle may have a height-adjustable seat that requires a height-adjustable coupling sleeve. Therefore, the adjustable shroud 410 and the swivel joint 420 operate to accommodate such a height-adjustable seat of the bicycle. The adjustable shroud 410 may be height-varied via a plurality of apertures as shown in FIG. 4A while the swivel joint 420 allows for bumps encountered by the bicycle and the like. The vehicle attachment mechanism 430 physically secures the shelter and storage pod system to the bicycle at the height determined by the adjustable shroud 410.

The vehicle attachment mechanism 430 may couple to the bicycle seat post via any suitable means including, but not limited to, metal rings, pins, apertures, rubber bushings, threaded bolts, threaded apertures, locking nuts and the like. Further, the vehicle attachment mechanism 430 may be modular in nature and selectively detachable from the remainder of the adjustable coupling sleeve 400 in order to attach an alternative vehicle attachment mechanism 430 to accommodate various vehicles such as, but not limited to, bicycles, motorcycles, scooters and the like. Additionally, a modular attachment mechanism 430 may accommodate a user's hand to allow the user to pull the pod by hand on foot.

As shown in FIG. 4B, the swivel joint 420 includes a first and second elongate member joined together at a swivel point which allows the elongate members to pivot through a radial path beginning at a first position 420a and ending at a second position 420b and may further be disposed at any point there between. This radial path includes relative movement between the two elongate members joined together at the swivel point shown in FIG. 4B. Such relative movement may occur due to vertical movement of a vehicle seat coupled to the vehicle attachment mechanism 430 or due to vertical movement of the adjustable shroud 410 via the attached pod. Additionally, the swivel joint 420 may be structured to dampen shock from bumps and divots in the path of travel of the pod and further to prevent binding when the pod is being hauled and turned around on an inclined surface.

As shown in FIG. 4C, the adjustable shroud 410 may comprise interlocking first and second elongate members 416, 418 having apertures 414 running there along. The first and second elongate members 416, 418 may be removably coupled together via any suitable engagement means 412 for engaging the apertures 414 including, but not limited to, U-bolts, locking nuts and the like. The engagement means 412 may be removed from the apertures 414 and the first and second elongate members 416, 418 height-adjusted relative one another whereupon the engagement means 412 may be reinserted into the apertures 414 to lock in the height-adjustment.

The specification and drawings are to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

The invention claimed is:

1. A shelter and storage pod system, comprising:
   a pod comprising a top wall, a bottom wall and four sidewalls, wherein the pod is structurally divided into a top portion and a bottom portion;
   a first hinge coupling the top portion to the bottom portion, wherein the top and bottom portions are movable relative one another via user actuation of a handle locking mechanism, wherein the handle locking mechanism may be locked and unlocked from an interior and an exterior of the pod;
   one or more ventilation ports structurally integrated into the top wall, bottom wall, four sidewalls or any combination thereof;
   a reinforcing frame member coupled to the bottom wall and comprising a yoke arm and a plurality of wheels coupled thereto;
   a bedding substrate disposed adjacent and orthogonal to the four sidewalls, wherein the bedding substrate is coupled to one sidewall via a second hinge;
   one or more vertical frame walls defining a plurality of storage compartments disposed under the bedding substrate, wherein:
     the one or more vertical frame walls structurally support the bedding substrate, and
     one or more of the pod, the reinforcing frame member and the one or more vertical frame walls are at least in part fabricated from fiberglass; and
   an adjustable coupling sleeve operatively coupled to the reinforcing frame member via the yoke arm.

2. The shelter and storage pod system of claim 1, wherein the pod exterior comprises a plurality of light emitting diodes, optical reflectors or any combination thereof.

3. The shelter and storage pod system of claim 1, wherein the one or more ventilation ports each are selectively waterproof, are substantially transparent and comprise one or more membranous air filters therein.

4. The shelter and storage pod system of claim 1, wherein the yoke arm comprises a substantially Y-shaped frame and couples together the reinforcing frame member and the adjustable coupling sleeve.

5. The shelter and storage pod system of claim 1, wherein the bedding substrate rotates upwards about the second hinge to allow access to the plurality of storage compartments thereunder.

6. The shelter and storage pod system of claim 1, wherein a reinforcing seam closure is disposed along each of a bottom surface of the top portion of the pod and a top surface of the bottom portion of the pod.

7. The shelter and storage pod system of claim 1, wherein the handle locking mechanism is structurally coupled to at least two of the sidewalls of the top and bottom portions of the pod.

8. The shelter and storage pod system of claim 1, wherein the adjustable coupling sleeve comprises an adjustable shroud, a swivel joint and a vehicle attachment mechanism.

9. The shelter and storage pod system of claim 8, wherein the adjustable shroud comprises first and second elongate members each having a plurality of apertures therethrough, wherein the first and second elongate members are coupled together via one or more threaded bolts disposed through the apertures and cooperating locking nuts.

10. The shelter and storage pod system of claim 8, wherein the vehicle attachment mechanism is modularly coupled to the swivel joint and replaceable based upon a type of vehicle to which the pod is to be coupled.

11. The shelter and storage pod system of claim 1, wherein the adjustable coupling sleeve couples the pod to a vehicle.

12. The shelter and storage pod system of claim 11, wherein the vehicle is a bicycle, a motorcycle, a car, a scooter, a moped or any combination thereof.

13. A shelter and storage pod system, comprising:
a pod comprising a top wall, a bottom wall and four sidewalls, wherein the pod is structurally divided into a top portion and a bottom portion;
a first hinge coupling the top portion to the bottom portion, wherein the top and bottom portions are movable relative one another via user actuation of a handle locking mechanism, wherein the handle locking mechanism may be locked and unlocked from an interior and an exterior of the pod;
one or more ventilation ports structurally integrated into the top wall, bottom wall, four sidewalls or any combination thereof;
a reinforcing frame member coupled to the bottom wall and comprising a yoke arm and a plurality of wheels coupled thereto, wherein the yoke arm comprises a substantially Y-shaped frame and couples together the reinforcing frame member and the adjustable coupling sleeve;
a bedding substrate disposed adjacent and orthogonal to the four sidewalls, wherein the bedding substrate is coupled to one sidewall via a second hinge;
one or more vertical frame walls defining a plurality of storage compartments disposed under the bedding substrate, wherein:
the one or more vertical frame walls structurally support the bedding substrate,
the bedding substrate rotates upwards about the second hinge to allow access to the plurality of storage compartments thereunder, and
one or more of the pod, the reinforcing frame member and the one or more vertical frame walls are at least in part fabricated from fiberglass; and
an adjustable coupling sleeve operatively coupled to the reinforcing frame member via the yoke arm, wherein the adjustable coupling sleeve comprises an adjustable shroud, a swivel joint and a vehicle attachment mechanism.

14. The shelter and storage pod system of claim 13, wherein the pod exterior comprises a plurality of light emitting diodes, optical reflectors or any combination thereof.

15. The shelter and storage pod system of claim 13, wherein the one or more ventilation ports each are selectively waterproof, are substantially transparent and comprise one or more membranous air filters therein.

16. The shelter and storage pod system of claim 13, wherein a reinforcing seam closure is disposed along each of a bottom surface of the top portion of the pod and a top surface of the bottom portion of the pod.

17. The shelter and storage pod system of claim 13, wherein the handle locking mechanism is structurally coupled to at least two of the sidewalls of the top and bottom portions of the pod.

18. The shelter and storage pod system of claim 13, wherein the adjustable shroud comprises first and second elongate members each having a plurality of apertures therethrough, wherein the first and second elongate members are coupled together via one or more threaded bolts disposed through the apertures and cooperating locking nuts.

19. The shelter and storage pod system of claim 13, wherein the vehicle attachment mechanism is modularly coupled to the swivel joint and replaceable based upon a type of vehicle to which the pod is to be coupled.

20. A shelter and storage pod system, comprising:
a pod comprising a top wall, a bottom wall and four sidewalls, wherein the pod is structurally divided into a top portion and a bottom portion, and wherein a reinforcing seam closure is disposed along each of a bottom surface of the top portion of the pod and a top surface of the bottom portion of the pod;
a first hinge coupling the top portion to the bottom portion, wherein the top and bottom portions are movable relative one another via user actuation of a handle locking mechanism, wherein the handle locking mechanism may be locked and unlocked from an interior and an exterior of the pod;
one or more ventilation ports structurally integrated into the top wall, bottom wall, four sidewalls or any combination thereof, wherein the handle locking mechanism is structurally coupled to at least two of the sidewalls of the top and bottom portions of the pod;
a reinforcing frame member coupled to the bottom wall and comprising a yoke arm and a plurality of wheels coupled thereto, wherein the yoke arm comprises a substantially Y-shaped frame and couples together the reinforcing frame member and the adjustable coupling sleeve;
a bedding substrate disposed adjacent and orthogonal to the four sidewalls, wherein the bedding substrate is coupled to one sidewall via a second hinge;
one or more vertical frame walls defining a plurality of storage compartments disposed under the bedding substrate, wherein:
the one or more vertical frame walls structurally support the bedding substrate,
the bedding substrate rotates upwards about the second hinge to allow access to the plurality of storage compartments thereunder, and
one or more of the pod, the reinforcing frame member and the one or more vertical frame walls are at least in part fabricated from fiberglass; and
an adjustable coupling sleeve operatively coupled to the reinforcing frame member via the yoke arm, wherein the adjustable coupling sleeve comprises an adjustable shroud, a swivel joint and a vehicle attachment mechanism, wherein the adjustable shroud comprises first and second elongate members each having a plurality of apertures therethrough, wherein the first and second elongate members are coupled together via one or more threaded bolts disposed through the apertures and cooperating locking nuts, and wherein the vehicle attachment mechanism is modularly coupled to the swivel joint and replaceable based upon a type of vehicle to which the pod is to be coupled.

* * * * *